United States Patent [19]

Herrmann et al.

[11] 4,317,897
[45] Mar. 2, 1982

[54] PROCESS FOR THE PRODUCTION OF EXTENSIVELY AMORPHOUS HOMO- AND/OR COPOLYMERS OF α-OLEFINS OF 3 OR MORE CARBON ATOMS

[75] Inventors: Christoph Herrmann; Roland Streck, both of Marl, Fed. Rep. of Germany

[73] Assignee: Chemische Werke Huels, A.G., Marl, Fed. Rep. of Germany

[21] Appl. No.: 118,339

[22] Filed: Feb. 4, 1980

[30] Foreign Application Priority Data

Feb. 21, 1979 [DE] Fed. Rep. of Germany ....... 2906639

[51] Int. Cl.$^3$ .......................... C08F 4/64; C08F 10/04; C08F 10/14
[52] U.S. Cl. ................. 526/116; 252/429 C; 252/431 R; 252/431 C; 526/114; 526/115; 526/119; 526/121; 526/124; 526/155; 526/348.6; 526/351
[58] Field of Search ............... 526/114, 115, 116, 119, 526/121, 124, 155

[56] References Cited

U.S. PATENT DOCUMENTS 3,901,863 8/1975 Berger et al. ....................... 526/114

FOREIGN PATENT DOCUMENTS 1275641 5/1972 United Kingdom ................ 526/114
1333759 10/1973 United Kingdom ................ 526/124
1434264 5/1976 United Kingdom ................ 526/124

*Primary Examiner*—Edward J. Smith
*Attorney, Agent, or Firm*—Millen & White

[57] ABSTRACT

A process for the preparation of an extensively amorphous homo- or copolymer of an α-olefin of 3–32 carbon atoms comprises polymerizing an α-olefin using a titanium-containing Ziegler-Natta catalyst, the catalyst comprising a mixture of
(A) the reaction product of
  (a) a μ-oxoalkoxide of the formula

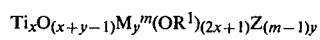

$$Ti_xO_{(x+y-1)}M_y{}^m(OR^1)_{(2x+1)}Z_{(m-1)y}$$

wherein
M is a metal of valence m,
$R^1$ is an alkyl residue of 1-10 carbon atoms,
Z is $C_{1-18}$ alkanoyloxy or $C_{1-10}$ alkoxy,
x is a whole or fractional number of 1-4,
y is a whole or fractional number of 1-2 and
m is 2, 3 or 4;
with
  (b) a halogen-containing organoaluminum compound of the formula

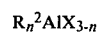

$$R_n{}^2AlX_{3-n}$$

wherein $R^2$ is $C_{1-16}$ alkyl,
X is chlorine, bromine or iodine, and
n is a whole or fractional number of 0.5–2.5, and
(B) an aluminum trialkyl of up to 16 carbon atoms in each alkyl group.

10 Claims, No Drawings

PROCESS FOR THE PRODUCTION OF EXTENSIVELY AMORPHOUS HOMO- AND/OR COPOLYMERS OF α-OLEFINS OF 3 OR MORE CARBON ATOMS

BACKGROUND OF THE INVENTION

It is known that α-olefins of 3 or more carbon atoms, such as propene and butene-1, can be polymerized using catalyst combinations of transition metal compounds and metal alkyls, i.e., to so-called Ziegler-Natta catalysts.

It is furthermore known that certain of these catalyst combinations, e.g., δ-TiCl$_3$ with AlEt$_2$Cl [M. Ogushi, CEER 8:49 (1976)], are especially effective in achieving a high proportion of monomer units incorporated in an isotactic arrangement. Due to this stereospecific structure, the thus-produced polyolefins are able to crystallize. This has a favorable effect on a number of properties, e.g., hardness, rigidity, strength. Accordingly, such polymers, primarily polypropylene, have developed into synthetic resins which can be used with great versatility and are manufactured industrially in large amounts.

In addition to isotactic polymers, however, all of these catalysts also yield more or less large quantities of atactic components differing from the former, inter alia, by extensive amorphism, solubility in hydrocarbons and tackiness. The latter are ordinarily isolated during the work up step to which the solvents used in the polymerization are subjected. Originally, these atactic components represented an undesirable and unavoidable by-product, whose appearance was to be minimized. However, due to efforts directed toward exploiting this unavoidable by-product, numerous uses have since been discovered. For example, the atactic polymer produced can be utilized in coating textiles, primarily for carpet backing, and paper. In addition, they can be used in the production of noise-damping materials and adhesives, sealing and caulking compounds, road-marking compositions, as well as bituminous materials which are used in road construction and roof coverings.

The development of novel processes for the production of polyolefins, primarily polypropylene (see, e.g., DOS's [German Unexamined Laid-Open Applications] Nos. 2,621,874 and 2,635,163), has provided a greatly improved exploitation of the catalysts, and also enabled a higher stereospecificity. As a result, the amount of thus-produced atactic material was no longer sufficient to cover all the marketing needs.

Consequently, processes have also been developed for preparing extensively atactic polyolefins. In these methods, a lowering of the stereospecificity can be attained by several measures which sometimes are also employed in combination. For example, in place of the mentioned α-TiCl$_3$ catalyst component, a titanium compound can be employed which has been prepared in situ by the reduction of TiCl$_4$ and/or of titanium(IV) alcoholates (German Patent No. 1,795,483). In another option, aluminum trialkyls or fluorinated aluminum alkyls are employed in place of the diethyl aluminum monochloride (German Patent No. 1,931,421 and Belgian Patent No. 733,692) frequently utilized for the production of polyolefins of high stereospecificity. It is also possible to prepare amorphous products using a Ziegler-Natta catalyst containing magnesium chloride (DOS No. 2,153,520 and German Patent No. 2,329,641). Additionally, the titanium component can be replaced by VCl$_4$ (Japanese Patent No. 4,005,753).

However, all of these prior-art methods exhibit deficiencies. The exploitation of the catalyst, for example, leaves much to be desired; as a result, the content of catalyst residues in the polymer is relatively high unless more or less expensive scrubbing processes are employed. As is known, the consequence of such additional processes is that the stability of the products is impaired.

Often, the content of isotactic components is still so high that the desired degree of amorphism can be attained disadvantageously, only by polymerization at an elevated temperature of above 100° C. (German Patent No. 2,329,641).

SUMMARY OF THE INVENTION

Accordingly, it is an object of the present invention to provide a process for the production of homo- and/or copolymers of α-olefins of 3 or more carbon atoms, by means of which it is possible to increase catalyst utilization, e.g., lifetime and activity, and to increase the yield of amorphous polymers while employing low, economically beneficial temperatures during the polymerization.

Upon further study of the specification and appended claims, further objects and advantages of this invention will become apparent to those skilled in the art.

These objects have been attained by providing a process for the preparation of extensively amorphous homo- and/or copolymers of α-olefins of 3 or more carbon atoms by the polymerization of the α-olefins using a titanium-containing Ziegler-Natta catalyst, which comprises carrying out the polymerization using a catalyst comprising:

1. the reaction products of 1.1 μ-oxoalkoxides of formula (I)

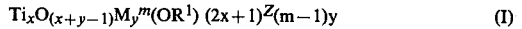

$$Ti_xO_{(x+y-1)}M_y{}^m(OR^1)_{(2x+1)}Z_{(m-1)y} \qquad (I)$$

wherein 1.1.1 M is a metal of valence m,
    1.1.2 R$^1$ is alkyl of 1–10 carbon atoms,
    1.1.3 Z is a carboxylate or alcoholate residue,
    1.1.4 x has a value of 1–4,
    1.1.5 y has a value of 1–2, and 1.1.6 m is 2, 3 or 4, with 1.2 halogen-containing organoaluminum compounds of formula (II)

$$R_n{}^2AlX_{3-n} \qquad (II)$$

wherein 1.2.1 R$^2$ is alkyl of 1–16 carbon atoms,
    1.2.2 X is chlorine, bromine or iodine, and
    1.2.3 n has a value of 0.5–2.5, and 2. aluminum trialkyls of up to 16 carbon atoms in each alkyl residue.

DETAILED DISCUSSION

Extensively amorphous homo- and copolymers are understood to mean, herein, products having a heptane solubility of >50% by weight. For homo- and copolymers made up entirely or predominantly of α-olefins of at least 4 carbon atoms, a further criterion of amorphism is the ether solubility (diethyl ether). In the products produced by the process of this invention, this solubility generally is >20% by weight, preferably >50% by weight. The heptane- or ether-soluble proportions of the polymers are conventionally determined after 16 hours of extraction of samples in the Soxhlet apparatus and subsequent drying and weighing of the residue (e.g., per ASTM D 2765-68).

Suitable α-olefins of 3 or more carbon atoms are of the formula $R^3CH=CH_2$ wherein $R^3$ is alkyl of 1–30 carbon atoms, preferably 1–8 carbon atoms. Propene and butene-1 are preferred. All monomers can be homopolymerized or copolymerized with one another in any desired ratio. Moreover, copolymerization of these monomers with ethylene is likewise possible in such an amount that up to 20% by weight, preferably 0.1–10% by weight, of ethylene is contained in the copolymer.

The μ-oxoalkoxides of formula I employed as transition metal components of the catalyst of this invention can be readily prepared by conventional methods. See, e.g., (F. Schmid, Houben-Weyl, 6/2 (1963) and Ph. Teyssie et al., Inorg. Chem. Acta 19 (1976): 2031).

Suitable metals are those in groups II to VIII of the periodic table.

In formula I, M is a metal of one of the valences m, i.e., 2, 3 or 4; for example for m=2: magnesium, manganese, zinc, chromium, molybdenum, iron, cobalt and nickel; for m=3: aluminium, lanthanum, cerium, vanadium, chromium and iron; and for m=4: titanium, zirconium, vanadium and cerium. m=2 is preferred, especially magnesium. $R^1$ is alkyl of 1–10 carbon atoms, preferably 2–4 carbon atoms. Z is a carboxylate residue of up to 18 carbon atoms, preferably 2–8 carbon atoms, more preferably an alkanoyloxy residue of these carbon atom ranges, especially acetate; an alcoholate residue of 1–10 carbon atoms, preferably 2–4 carbon atoms, more preferably an alkoxy residue of these carbon atom ranges. The Z residues can be unsaturated or substituted by halogen, alkoxy- and optionally substituted aminogroups. x can be a whole or fractional number of 1–4, preferably 1–2; and y can be a whole or fractional number of 1–2, preferably 1–1.5.

One method for the preparation of these μ-oxoalkoxides is by thermal ester cleavage from mixtures of titanium alcoholates of the formula $Ti(OR^1)_4$, wherein the residues $R^1$ can be identical or different alkyl residues of 1–10 carbon atoms, preferably 2–4 carbon atoms, and anhydrous carboxylates, preferably acetates of divalent, trivalent or tetravalent metals, e.g., magnesium, manganese, zinc, aluminum, lanthanum, cerium, titanium and the like; or of mixtures of titanium carboxylates or titanium alcoholate carboxylates of the formula $TiZ_4$, wherein Z is as defined for formula I, and metal alcoholates $M^m(OR^1)_m$ wherein M, $R^1$ and m are also as defined for formula I. Generally, suitable temperatures are 150°–250° C.

Another way of producing μ-oxoalkoxides is by partial cohydrolysis of 2:1 alcoholate complexes of Meerwein or of alcoholate mixtures of $Ti(OR^1)_4$ and $M^m(OR^1)_m$, wherein M, $R^1$ and m are as defined for formula I. The residues $R^1$ in the titanium alcoholate and metal alcoholate need not be identical. Especially suitable are μ-oxoalkoxides with M=magnesium and a molar ratio of Mg:Ti of 0.25–1.5.

The μ-oxoalkoxides may optionally be modified before they are reacted with component 1.2. For example, they can be fixed onto supports carrying hydroxy groups, such as, for example, silicic acid ($SiO_2$) and aluminum oxides, or onto halogen-containing supports, by combined grinding, e.g., in a ball mill for 1–15 hours, such as, for example, magnesium chloride, rare earth chlorides and aluminum chloride [K. H. Reichert, "Chem.-Ing.-Tech." [Chemical Engineering] 49 (1977): 626–633 and J. C. W. Chien, J. T. T. Hsieh, Journ. of Polym. Sci., Poly., Chem. Ed. 14 (1976): 1915–1932]. They can also be modified by reaction, e.g., with vanadium oxytrichloride, vanadium tetrachloride or titanium tetrachloride, e.g., by reaction at 50°–200° C. for 0.5–10 hours. Suitable are molar ratios of modifying metal to titanium in the original μ-oxoalkoxide in the range of 0.5–4. The μ-oxoalkoxides previously soluble in the solvents which may be employed in the process of this invention are rendered heterogeneous by these modification methods.

A preferred modification is by reaction with $TiCl_4$ or any of the vanadium chlorides. In the reaction with the vanadium chloride, a molar ratio of 0.5 to 2 relative to the starting μ-oxoalkoxide is especially preferred.

Surprisingly, the separated μ-oxoalkoxides as well as their modified derivatives are far superior to the mixtures of the starting materials in their efficacy.

Suitable halogen-containing organoaluminum compounds have the formula $R_n^2AlX_{3-n}$ (II). $R^2$ is alkyl of 1–16 carbon atoms, preferably 2–4 carbon atoms and can be the same or different. X is chlorine, bromine or iodine, preferably chlorine. n is a whole or fractional number of 0.5–2.5, preferably 1–2. Suitable such compounds for the reaction with the μ-oxoalkoxides of formula I include, for example, diethyl aluminum monochloride, ethyl aluminum dichloride, isobutyl aluminum dichloride, etc., and mixtures thereof.

To react the catalyst component 1.1 with the catalyst component 1.2, 1.1 is dissolved in a saturated hydrocarbon, e.g., hexane, heptane, the hydrogenated petroleum ether customarily utilized in ethylene polymerizations, cyclohexane, isopropylcyclohexane and hydrogenated diesel oils, and combined in a concentration of 0.25–1.5 mole of transition metal per liter of solvent with a corresponding solution of 1.2. Generally, the 0.25–1.5 molar solution of 1.1 is first prepared, and then a 0.5–2.0 molar, preferably a 1-molar solution is 1.2 in one of the above-mentioned solvents is added dropwise thereto at a maximally constant temperature in the range of 0° to 100° C. over a period of time of 0.5–2 hours. Thereafter, the thus-obtained suspension is aged over a time period of 1–10 hours at temperatures in the range of 50°–200° C. Thereafter, the product is filtered, the precipitate is washed with a solvent mentioned above and finally suspended.

The polymerization-active catalyst is suitably prepared in the polymerization apparatus by reacting, i.e., mixing, the catalyst component 2 with the reaction product of 1.1 and 1.2. Suitable catalysts components 2 include aluminum trialkyls of up to 16, preferably 3–10 carbon atoms, in each alkyl residue. The alkyl groups may be the same or different. Especially preferred is triisobutyl aluminum. In general, the aluminum trialkyls are used in an approximately 1-molar solution, e.g., 0.5–10 molar, in a saturated hydrocarbon, e.g., those mentioned above, which is compatible with the polymerization solvent, in such a quantity that the ratio of Ti:Al (of catalyst component (2) is 1:2–1:20.

The polymerization can be conducted continuously or discontinuously. Solvents employed are ordinarily those which have been mentioned above, i.e., the saturated hydrocarbons. However, it is also possible to employ liquid $C_3$- and/or $C_4$-cuts or liquefied α-olefins as the solvents. The polymerization temperature is generally 30°–150° C., preferably 40°–90° C.

The molecular weight of the product can be regulated, as is conventional, by the addition of hydrogen. Moreover, the molecular weights are affected, as is known, by the polymerization temperature, the pressure and the composition of the individual catalyst components. The polymerization batches can be worked up by following the usual prior-art methods, such as, for example, precipitation with an alcohol or an alcohol-water mixture or by removing the solvent by distillation. The method selected depends on the viscosity of the polymer solution or suspension involved. In general, unless indicated otherwise herein, all details of the process of this invention are conventional and may be determined, for example, as described in High Polymers, Vol XXIX (1977), Ed. by C. E. Schildknecht and J. Skeist.

The polymers or copolymers obtained according to the process of this invention can be utilized for all purposes already recited and/or known for the utilization of atactic polyolefins.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the following examples and comparative examples, the viscosity number I (cc/g) was determined according to DIN [German Industrial Standard] 53 728, and the heptane-or ether-soluble components of the polymers were determined by 16-hour extraction in a Soxhlet apparatus.

The abbreviations used herein have the following meanings:
TEA = triethylaluminum
TIBA = triisobutylaluminum
TNOA = tri-n-octylaluminum
TNDA = tri-n-decylaluminum
TNHA = tri-n-hexadecylaluminum
Bu = n-butyl
Et = ethyl
AcO = acetate Preparation of μ-Oxoalkoxides by (a) Cohydrolysis and (b) Ester Condensation In method (a), 600 millimoles of $Ti(OBu)_4$ and 300 millimoles of $Mg(OEt)_2$ were refluxed in 350 ml of n-butanol for one-half hour. Then 600 mmol of water in 250 ml of butanol was added dropwise, and the reaction mixture was heated under reflux for 10 hours. After cooling, the mixture was filtered and evaporated to dryness. The distillate was examined by gas chromatography; in addition to the solvent butanol, 500 mmol of ethanol was found from the magnesium ethylate. For further processing, the solid residue, containing 18.5% of titanium and 2.86% of magnesium, corresponding to a molar ratio of Mg:Ti=0.31, was taken up in 1 liter of a hydrogenated petroleum ether [benzine] fraction (boiling point about 68° C.). This μ-oxoalkoxide will be denoted by I hereinbelow.

In method (b), the reactants indicated in Table 1 were heated under reflux for the indicated time periods in the indicated amounts—dissolved in decahydronaphthalene. After distilling the ester and decahydronaphthalene, the remaining mixture was taken up in hydrogenated petroleum ether and optionally filtered. The concentration of titanium was about 0.4 mole per liter. In the distillates, the indicated amounts of butyl acetate were determined by gas chromatrography.

TABLE 1

| Symbol for μ-Oxo-alkoxide | 1 $Ti(OBu)_4$ (mmol.) | 2 $Mg(OEt)_2$ (mmol.) | 3 $Mg(OAc)_2$ (mmol.) | 4 "Decalin" (ml.) | 5 Reaction Time (h.) | 6 AcOBu (mmol.) | 7 Mg/Ti (mol/mol) |
|---|---|---|---|---|---|---|---|
| II | 400 | | 200 | 400 | 10 | 193 | 0.35 |
| III | 400 | | 200 | 400 | 15 | 220 | 0.65 |
| IV | 200 | | 600 | 200 | 10 | 221 | 0.91 |
| V | 100[1] | 100 | | 100 | 10 | (2) | |
|   |     |     | 100 | 100 | 10 |     | 1.37 |
| VI | 400 | | 400 | 600 | 12 | 483[3] | 0.87 |

[1]$Ti(OBu)_2(OAc)_2$ was used as the Ti compound, rather than $Ti(OBu)_4$, and reacted in succession with respectively 100 mmol. of $Mg(OEt)_2$ and $Mg(OAc)_2$.
[2]Not determined.
[3]Continuous removal of the ester by distillation.

Reaction of the μ-Oxoalkoxide Solutions (Hydrogenated Petroleum Ether as the Solvent) with Halogen-Containing Organo-aluminum Compounds The μ-oxoalkoxides I through VI and the corresponding catalyst components indicated in the comparative examples of Table 2 were reacted with a 1-molar solution of halogen-containing organoaluminum compound of Formula II in hydrogenated petroleum ether in the respectively indicated molar ratios of aluminum:titanium per Table 2. The solution of catalyst component 1.2 was added dropwise to the provided solution of catalyst component 1.1 at 25°–30° C. Thereafter, an aging step was conducted for 1 hour, unless indicated otherwise, at 68° C. (boiling point of the hydrogenated petroleum ether). After filtration of the suspension, the precipitate was washed repeatedly with the indicated solvent, taken up in hydrogenated petroleum ether, and the thus-obtained suspension was used in the polymerization.

EXAMPLES 1–5 AND COMPARATIVE EXAMPLES A AND B

A 5-liter steel autoclave was charged respectively with 2.5 liters of hydrogenated petroleum ether, to which were added 6 ml of a 1-molar AlEt3 solution in hydrogenated petroleum ether, and the respectively indicated amount of titanium (in mmol). The autoclave was then topped with hydrogen under normal pressure (=1 bar) and heated to 50° C. After this temperature had been reached, the propene conduit was opened up, and the thus-fed propene was polymerized for one-half hour under the initial excess pressure. The feed of propene was then terminated and the charge was further polymerized for another 1½ hours under falling pressure. The final pressure is indicated in the column "Pressure" of Table 2. After the polymer solution or suspension had been cooled to room temperature (25° C.), it was forced out of the autoclave, and the polymer was precipitated with 5 liters of a mixture of isopropanol/methanol (volume ratio 1:2). The product was then freed of residual solvent by drying at 50° C. under vacuum. For comparison purposes, Comparative Example A deals with alcoholates which are not linked to oxygen, and Comparative Example B involves a commercially available α-TiCl3 catalyst (ATR). The yield is indicated as the activity in g. of polypropylene per millimole of titanium (g. PP/mol. Ti).

EXAMPLES 6-12

The procedure was the same as for Examples 1-5 except that modifications were made in component 1.2, in the solvent and in the aging temperature. The activation of the reaction products from 1.1 and 1.2 was effected respectively with 10 mmol of AlEt3. The results are indicated in Table 3.

TABLE 3

| Example No. | 1 μ-Oxo-alkoxide | 2 Catalyst Component 1.2 | 3 Molar Ratio Al/Ti | 4 Aging Temp. (°C.) | 5 Amount Ti in 1.1 and 1.2 (mmol.) | 6 Pressure initial-final (bar) | 7 Activity g. PP/mmol. Ti | 8 I (cc./g.) | 9 Heptane-Soluble Components (%) |
|---|---|---|---|---|---|---|---|---|---|
| 6 | IV | AlEtCl2 | 3 | 98(1) | 0.81 | 4.9-1.3 | 528 | 106 | 78 |
| 7 | IV | AlEtCl2 | 3 | 145(2) | 0.82 | 5.1-3.6 | 126 | 77 | 80 |
| 8 | V | AlEtCl2 | 6 | 68 | 1.0 | 4.2-1.0 | 420 | 80 | 74 |
| 9 | V | AlEtCl2 | 6 | 68 | 1.46 | 4.5-0.4 | 420 | 111 | 70 |
| 10 | V | AlEtCl2 | 12 | 68 | 1.42 | 4.9-2.0 | 63 | 99 | 67 |
| 11 | V | AlEt2Cl | 6 | 68 | 2.0 | 3.8-0.9 | 140 | 72 | 76 |
| 12 | V | AlEt2Cl | 12 | 68 | 1.0 | 4.5-0.6 | 456 | 76 | 74 |

(1)Solvent = Heptane
(2)Solvent = "Decalin"

EXAMPLES 13-18

In these examples the μ-oxoalkoxides were treated, prior to reaction with component 1.2, with a metal halide of the type indicated. In Examples 13 and 14, the μ-oxoalkoxide solution was refluxed with VOCl3 in the indicated molar ratio for one hour; in Examples 15-18, the μ-oxoalkoxide solution was ground together with the indicated metal halide for 3 hours in a ball mill at 25° C. Thereafter, reaction with component 1.2 was carried out at 68° C. Activation and polymerization took place as in Examples 1-5. The results are shown in Table 4.

TABLE 4

| Example No. | 1 μ-Oxoalk-oxide | 2 Metal Halide | 3 Molar Ratio M/Ti | 4 Catalyst Component 1.2 | 5 Molar Ratio Al/Ti | 6 Amount Ti in 1.1 and 1.2 (mmol.) | 7 Pressure initial-final (bar) | 8 Activity g. PP/mmol. Ti | 9 I (cc./g.) | 10 Heptane-Soluble Components (%) |
|---|---|---|---|---|---|---|---|---|---|---|
| 13 | VI | VOCl3 | 1 | AlEtCl2 | 6 | 1.1(1) | 6.5-4.2 | 555(1) | 194 | 75 |
| 14 | II | VOCl3 | 2 | AlEt2Cl | 18 | 0.5(1) | 4.9-1.7 | 804(1) | 123 | 68 |
| 15 | II | MgCl2 | 1 | AlEtCl2 | 3 | 1.05 | 8.4-6.1 | 342 | 123 | 77 |
| 16 | II | MgCl2 | 10 | AlEtCl2 | 3 | 0.98 | 8.2-3.5 | 700 | 157 | 75 |
| 17 | VI | MgCl2 | 1 | AlEtCl2 | 3 | 1.1 | 8.7-4.8 | 578 | 65 | 76 |
| 18 | I | AlCl3 | 5 | AlEt2Cl | 3 | 3.0 | 6.0-4.2 | 70 | 162 | 62 |

(1)Titanium and Vanadium

EXAMPLES 19-25

The mode of operation used in the polymerization with the catalysts of Examples 1-5 was repeated, with

TABLE 2

| Example or Comparative Example No. | μ-Oxoalkoxide (1.1) of Comparison Product | Catalyst Component 1.2 | Molar Ratio Al/Ti | Amount Ti in 1.1 and 1.2 (mmol.) | Pressure initial-final (bar) | Activity g. PP/mmol. Ti | I (cc./g.) | Heptane-Soluble Components (%) |
|---|---|---|---|---|---|---|---|---|
| 1 | I | AlEtCl2 | 3 | 3 | 6.3-2.3 | 182 | 183 | 71 |
| 2 | II | AlEtCl2 | 3 | 2 | 4.9-1.3 | 246 | 115 | 70 |
| 3 | III | AlEtCl2 | 3 | 1.5 | 7.0-3.8 | 252 | 229 | 75 |
| 4 | IV | AlEtCl2 | 3 | 0.77 | 5.0-2.8 | 242 | 100 | 75 |
| 5 | V | AlEtCl2 | 3 | 1 | 5.3-3.7 | 132 | 70 | 78 |
| A | 2Ti(OBu)4 + Mg(OEt)2 | AlEtCl2 | 3 | 1 | 7.3-6.3 | 30 | 81 | 84 |
| B | α-TiCl3 | — | — | 3 | 6.9-2.0 | 73 | 164 | 66 | the modification that the activation of the washed catalysts in the autoclave was conducted, instead of with TEA as previously, with aluminum alkyls with hydrocarbon residues larger than 2 carbon atoms as recited in Table 5. Also, the ratio of Al/Ti of components 1.1 and 1.2, as well as the partial H₂ pressure (Examples 24 and 25) was modified in several examples. For activating purposes, 10 mmol of the indicated aluminum trialkyl worked up analogously to Examples 1–5. In comparative Example C, the indicated compounds of catalyst components, which had not reacted with each other, were utilized and tested under the same conditions. It can clearly be seen from a comparison of Examples 26 and C that the condensed oxoalkoxide forms a substantially more active catalyst than do the unreacted starting compounds. The results are set forth in Table 6.

TABLE 6

| Example No. | 1 μ-Oxoalkoxide (1.1) or Comparison Product | 2 Catalyst Component 1.2 | 3 Molar Ratio Al/Ti | 4 Amount of Ti in 1.1 and 1.2 (mmol.) | 5 Pressure Drop pC3 (bar) | 6 Activity g. PP/ mmol. Ti | 7 I (cc./g.) | 8 Heptane-Soluble Components (%) |
|---|---|---|---|---|---|---|---|---|
| 26 | V | AlEtCl₂ | 6 | 0.28 | 6.4–1.1 | 1240 | 77 | 75 |
| 27 | VI | AlEtCl₂ | 6 | 0.3 | 6.4–2.4 | 946 | 76 | 79 |
| 28 | VI | AlEt₁.₅Cl₁.₅ | 6 | 0.35 | 6.4–1.3 | 930 | 79 | 83 |
| 29 | VI + VOCl₃ (Ti:V = 1) | AlEt₂Cl | 12 | 0.13 | 6.5–1.7 | 2480[1] | 97 | 74 |
| C | Ti(OBu)₄ + Mg(OAc)₂ | AlEtCl₂ | 6 | 0.75 | 6.0–0.1 | 507 | 61 | 85 |
| D | α-TiCl₃ | — | — | 1.0 | 6.3–3.8 | 149 | 96 | 71 |

[1] g. PP/mmol. (Ti + V)

was utilized. The results are shown in Table 5.

TABLE 5

| Example No. | μ-Oxoalk- oxide | Catalyst Component 1.2 | Molar Ratio Al/Ti | Amount Ti in 1.1 and 1.2 (mmol.) | Catalyst Component 2 | Pressure initial-final (bar) | Polym. Temp. (°C.) | H₂ (bar) | Activity g. PP/ mmol. Ti | I (cc./g.) | Heptane-Soluble Components (%) |
|---|---|---|---|---|---|---|---|---|---|---|---|
| 19 | IV | AlEtCl₂ | 3 | 0.5 | TIBA | 5.0–0.9 | 50 | 1.0 | 912 | 87 | 85 |
| 20 | IV | AlEtCl₂ | 3 | 0.5 | TNOA | 4.4–0.7 | 50 | 1.0 | 696 | 87 | 83 |
| 21 | IV | AlEtCl₂ | 3 | 0.5 | TNDA | 5.0–0.9 | 50 | 1.0 | 672 | 71 | 86 |
| 22 | IV | AlEtCl₂ | 3 | 0.5 | TIBA | 5.2–0.8 | 70 | 1.0 | 866 | 92 | 85 |
| 23 | IV | AlEtCl₂ | 3 | 0.5 | TIBA | 5.6–2.1 | 85 | 1.0 | 510 | 74 | 81 |
| 24 | VI | AlEtCl₂ | 6 | 1.0 | TEA | 4.6–0.5 | 50 | 1.5 | 504 | 63 | 74 |
| 25 | VI | AlEtCl₂ | 6 | 1.0 | TEA | 4.6–0.9 | 50 | 2.0 | 350 | 43 | 78 |

EXAMPLES 26–29 AND COMPARATIVE EXAMPLES C AND D

The mode of operation in polymerization Examples 1 through 5 was repeated, with the modification that 2.5 liters of hydrogenated petroleum ether was provided in the autoclave, and the activator, 10 ml of a 1-molar TIBA-hexane solution, and the catalyst suspension (1.1 and 1.2) were added by pipetting in the indicated quantities. After topping off with hydrogen, 800 ml of propene was then added under pressure and the polymerization was started up by heating to 50° C. After 2 hours, the mixture was cooled to 25° C.; and the viscous polymer solution was forced out of the autoclave and

EXAMPLES 30–42 AND COMPARATIVE EXAMPLES E–H

A 5-liter steel autoclave was charged in succession with 2.5 liters of hydrogenated petroleum ether, with the aluminum trialkyl indicated in Table 7, in the respective amount, and furthermore with the respectively indicated quantity of titanium. After topping off with nitrogen (1 bar), 400 ml of liquid butene-1, abbreviated as C₄ in the tables, was added, and the charge was heated in each case to 50° C. After 2 hours, the highly viscous polymer was discharged and worked up as described in Examples 1–5. The results are indicated in Table 7.

TABLE 7

| Example No. | Reaction Product 1.1 and 1.2 Acc. to Ex. No. | Amount Ti in 1.1 and 1.2 (mmol.) | Catalyst Component 2 | Amount of Catalyst Component 2 (mmol.) | Pressure Drop pC4 (bar) | Activity g. PB.[1] /mmol. Ti | I (cc./g.) | Ether-Soluble Proportions (%) |
|---|---|---|---|---|---|---|---|---|
| 30 | 1 | 2.53 | TEA | 6 | 1.5–1.2 | 28 | 417 | 21 |
| 31 | 2 | 3.0 | TEA | 6 | 1.2–0.4 | 68 | 291 | 38 |
| 32 | 4 | 0.76 | TEA | 10 | 1.1–1.0 | 71 | 185 | 59 |
| 33 | 5 | 2.0 | TEA | 10 | 1.3–1.2 | 13 | 533 | 23 |
| 34 | 6 | 0.81 | TEA | 10 | 1.2–0.7 | 201 | 391 | 44 |
| 35 | 8 | 1.0 | TEA | 10 | 1.2–0.2 | 273 | 161 | 51 |
| 36 | 9 | 2.0 | TEA | 10 | 1.1–0.2 | 103 | 188 | 54 |
| 37 | 10 | 1.42 | TEA | 10 | 1.2–0.7 | 127 | 304 | 44 |
| 38 | 11 | 2.0 | TEA | 10 | 1.1–0.8 | 61 | 221 | 51 |
| 39 | 12 | 1.0 | TEA | 10 | 1.2–0.6 | 213 | 283 | 39 |
| 40 | 8 | 0.11 | TIBA | 10 | 1.2–0.8 | 1018 | 381 | 48 |
| 41 | 8 | 0.5 | TNOA | 10 | 1.0–0.0 | 526 | 251 | 64 |

TABLE 7-continued

| 42 | 8 | 0.28 | TNHA | 10 | 1.2-0.6 | 774 | 345 | 60 |

| Comp. Example No. | Comparison Products | Amount Ti in Comp. Product (mmol.) | Catalyst Component 2 | Amount of Catalyst Component 2 (mmol.) | Pressure Drop pC$_4$ (bar) | Activity g. PB.[(1)] /mmol. Ti | I (cc./g.) | Ether Soluble Components (%) |
|---|---|---|---|---|---|---|---|---|
| E | A | 2.0 | TEA | 6 | 1.7-1.6 | 1 | — | — |
| F | Ti(OBu)$_4$ + Mg(OEt)$_2$ | 0.8 | TEA | 10 | 1.1-0.8 | 107 | 200 | 49 |
| G | C | 0.75 | TIBA | 10 | 1.1-0.4 | 254 | 285 | 60 |
| H | α-TiCl$_3$ | 3.0 | TIBA | 6 | 1.6-0.7 | 85 | 463 | 49 |

EXAMPLES 43-46

The apparatus described in the preceding examples was charged with 2.5 liters of hydrogenated petroleum ether, 10 mmol of TIBA and 0.38 mmol of Ti in the form of the reaction products of catalyst components 1.1 and 1.2 of Example 6. The liquid monomers propene and butene-1 were added in succession and in metered amounts to this reaction mixture in the respectively indicated quantities. A hydrogen pressure of 1.5 bar was applied, and the mixture was polymerized for 2 hours at 50° C. After cooling to 25° C., the copolymer solution was forced out of the autoclave, and the solvent was removed by distillation. The results are indicated in Table 8.

TABLE 8

| Example No. | Propene (g.) | Butene-1 (g.) | g. Polymer/ mmol. Ti | I (cc/g) | Ether-Soluble Components (%) |
|---|---|---|---|---|---|
| 43 | 26 | 331 | 794 | 69 | 78.7 |
| 44 | 52 | 301 | 710 | 61 | 91 |
| 45 | 105 | 240 | 780 | 61 | 95.4 |
| 46 | 157 | 180 | 850 | 62 | 93.4 |

The preceding examples can be repeated with similar success by substituting the generically or specifically described reactants and/or operating conditions for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of an extensively amorphous homo- or copolymer of an α-olefin of 3-32 carbon atoms comprising polymerizing an α-olefin using a titanium-containing Ziegler-Natta catalyst, the catalyst consisting essentially of a mixture of
(A) the reaction product of
(a) a μ-oxoalkoxide of the following formula, wherein the μ-oxoalkoxide has been separated from the reaction mixture in which it was prepared, $$Ti_xO_{(x+y-1)}M_y{}^m(OR^1)_{(2x+1)}Z_{(m-1)y}$$

wherein
M is a metal of valence m,
R$^1$ is an alkyl residue of 1-10 carbon atoms,
Z is C$_{1-18}$ alkanoyloxy or C$_{1-10}$ alkoxy,
x is a whole or fractional number of 1-4,
y is a whole or fractional number of 1-2, and
m is 2, 3 or 4; with
(b) a halogen-containing organoaluminum compound of the formula $$R_n{}^2AlX_{3-n}$$

wherein
R$^2$ is C$_{1-16}$ alkyl,
X is chlorine, bromine or iodine, and
n is a whole or fractional number of 0.5-2.5, and
(B) an aluminum trialkyl of up to 16 carbon atoms in each alkyl group.

2. The process of claim 1, wherein the catalyst component (a) is applied to a support containing hydroxy groups prior to being reacted with component (b).

3. The process of claim 1, wherein component (a) is treated with a metal halide prior to reaction with component (b).

4. The process of claim 1, wherein the α-olefins are of the formula R$^3$CH=CH$_2$ wherein R$^3$ is alkyl of 1-8 carbon atoms.

5. The process of claim 1, wherein the α-olefin is propene or butene-1.

6. The process of claim 3, wherein the metal halide is TiCl$_4$ or a vanadium halide.

7. The process of claim 1 wherein the μ-oxoalkoxide component A has been separated from its preparation reaction mixture by distillation of the by-products and solvent in the latter.

8. The process of claim 7 wherein the by-products and solvent include an ester, an alcohol or both.

9. A process of claim 1 wherein M is Mg.

10. A process of claim 1 wherein catalyst component (a) was prepared by a reaction run at a temperature of 150°-250° C.

* * * * *